United States Patent
Fishburn et al.

(10) Patent No.: US 12,423,669 B2
(45) Date of Patent: Sep. 23, 2025

(54) SCALE HAVING A MACHINE-READABLE CODE DISPLAY

(71) Applicant: Walmart Apollo, LLC, Bentonville, AR (US)

(72) Inventors: Lindsay A. Fishburn, Bentonville, AR (US); Stephen Caution, Bentonville, AR (US); Thomas P. Smith, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 18/198,336

(22) Filed: May 17, 2023

(65) Prior Publication Data

US 2023/0289764 A1    Sep. 14, 2023

Related U.S. Application Data

(63) Continuation of application No. 17/370,108, filed on Jul. 8, 2021, now Pat. No. 11,681,996, which is a continuation of application No. 16/030,188, filed on Jul. 9, 2018, now abandoned.

(60) Provisional application No. 62/535,019, filed on Jul. 20, 2017.

(51) Int. Cl.
| | |
|---|---|
| G06Q 20/20 | (2012.01) |
| G01G 19/41 | (2006.01) |
| G01G 19/414 | (2006.01) |
| G06K 7/14 | (2006.01) |
| G07G 1/00 | (2006.01) |
| G07G 1/01 | (2006.01) |

(52) U.S. Cl.
CPC ....... *G06Q 20/208* (2013.01); *G01G 19/4144* (2013.01); *G06K 7/1417* (2013.01); *G07G 1/0072* (2013.01); *G07G 1/01* (2013.01)

(58) Field of Classification Search
CPC ... G06Q 20/208; G06Q 10/087; G06K 7/1417
USPC ....................................... 705/23, 28
See application file for complete search history.

(56) References Cited

U.S. PATENT DOCUMENTS

| | | |
|---|---|---|
| 5,789,732 A | 8/1998 | McMahon |
| 7,587,335 B2 | 9/2009 | Schuller |
| 9,062,999 B2 | 6/2015 | Brouhard |
| 9,091,587 B2 | 7/2015 | Kawamura |

(Continued)

FOREIGN PATENT DOCUMENTS

| | | | | |
|---|---|---|---|---|
| GB | 2515345 A | * | 12/2014 | ......... G01G 19/4144 |
| WO | 2019018327 | | 1/2019 | |

OTHER PUBLICATIONS

Alamy, Mechanical hanging weight scale, 2016, JS Mimages, Vancouver, BC, Canada.

(Continued)

*Primary Examiner* — Ariel J Yu
*Assistant Examiner* — Denisse Y Ortiz Roman
(74) *Attorney, Agent, or Firm* — Fitch, Even, Tabin & Flannery LLP

(57) ABSTRACT

In some embodiments, systems, apparatuses and methods are provided herein useful to provide a weight of a product in a machine-readable code on a scale. More specifically, the scale can include an associated display that is configured to display a machine-readable code when a product is weighed on the scale, where the machine-readable code informs a scanning computing device of the weighed amount.

16 Claims, 9 Drawing Sheets

(56) References Cited

U.S. PATENT DOCUMENTS

| | | | |
|---|---|---|---|
| 9,177,186 | B1 | 11/2015 | Rinehart |
| 10,001,403 | B2 | 6/2018 | Brouhard |
| 11,681,996 | B2 | 6/2023 | Fishburn |
| 2002/0065728 | A1* | 5/2002 | Ogasawara ........ G06Q 20/3227 705/23 |
| 2013/0080289 | A1 | 3/2013 | Roy |
| 2014/0262549 | A1 | 9/2014 | Brouhard |
| 2015/0025969 | A1 | 1/2015 | Schroll |
| 2019/0026717 | A1 | 1/2019 | Fishburn |
| 2021/0334781 | A1 | 10/2021 | Fishburn |

OTHER PUBLICATIONS alibaba.com; "2016 brand new weighing scale with printer"; https://www.alibaba.com/productdetail/2016brandnewweighingscalewith_60409142441.html; Jan. 16, 2017; pp. 1-8.

amazon.com; "Cas LP1000N Label Printing Scale"; https://www.amazon.com/CAS%C2%ADLP1000N%C2%ADPrinting%C2%ADCapacity%C2%ADReadability/dp/B002OIED1S/ref=sr_1_2?ie=UTF8&qid=1484464909&sr=8%C2%AD2&keywords=pos+wei%E2%80%A6; Jan. 16, 2017; pp. 1-5.

Detecto; "SCS30 Solar Hanging Scale"; http://www.detecto.com/cs_product/scs30solarhangingscale/; Jan. 16, 2017; pp. 1-3.

Industrial Weigh & Measure; "POS Scales"; iWAM Magazine; Jan./Feb. 2016; pp. 1-41.

PCT; App. No. PCT/US2018/042370; International Preliminary Report on Patentability mailed Jan. 30, 2020.

PCT; App. No. PCT/US2018/042370; International Search Report and Written Opinion mailed Oct. 15, 2018.

USPTO; U.S. Appl. No. 16/030,188; Notice of Allowance mailed Apr. 12, 2021; (pp. 1-8).

USPTO; U.S. Appl. No. 16/030,188; Office Action mailed Jun. 19, 2020, (pp. 1-13).

USPTO; U.S. Appl. No. 16/030,188; Office Action mailed Nov. 4, 2020; (pp. 1-17).

USPTO; U.S. Appl. No. 17/370,108; Notice of Allowance and Fees Due (PTOL-85) mailed Feb. 10, 2023; (pp. 1-8).

\* cited by examiner

SCALE HAVING A MACHINE-READABLE CODE DISPLAY

CROSS-REFERENCE TO RELATED APPLICATIONS

This application is a continuation of U.S. application Ser. No. 17/370,108 filed Jul. 8, 2021, which is a continuation of U.S. application Ser. No. 16/030,188 filed Jul. 9, 2018, which claims the benefit of the following U.S. Provisional Application No. 62/535,019 filed Jul. 20, 2017, all of which are incorporated herein by reference in their entireties.

TECHNICAL FIELD

This invention relates generally to a scale for products.

BACKGROUND

Computing devices and the software operating thereon are providing new methods of shopping. In one example, a customer can identify products during a shopping trip and a list of products will be compiled for fast checkout. In such an example, however, products that are priced according to weight, but that allow a customer to select a desired amount, can present a problem. The customer may have to present the product for weighing and pricing at a point-of-sale, which can slow down the check-out process.

BRIEF DESCRIPTION OF THE DRAWINGS

Disclosed herein are embodiments of systems, apparatuses and methods pertaining to scales for weighing products. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful to provide a weight of a product in a machine-readable code on a scale. More specifically, the scale can include an associated display that is configured to display a machine-readable code when a product is weighed on the scale, where the machine-readable code informs a scanning computing device of the weighed amount.

Figure 1:
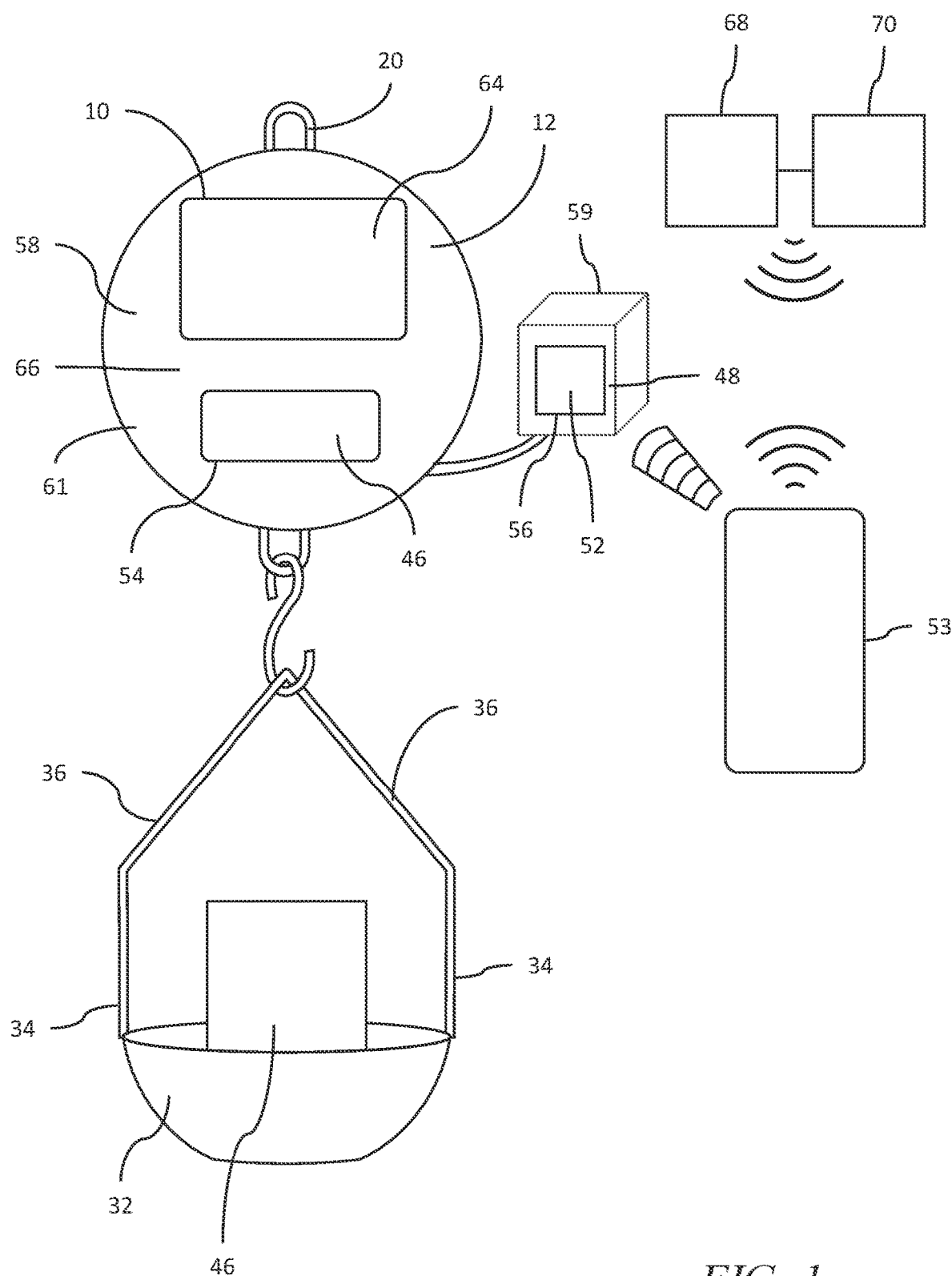
FIG. 1 is a diagrammatic view of a scale in accordance with some embodiments.
Figure 2:
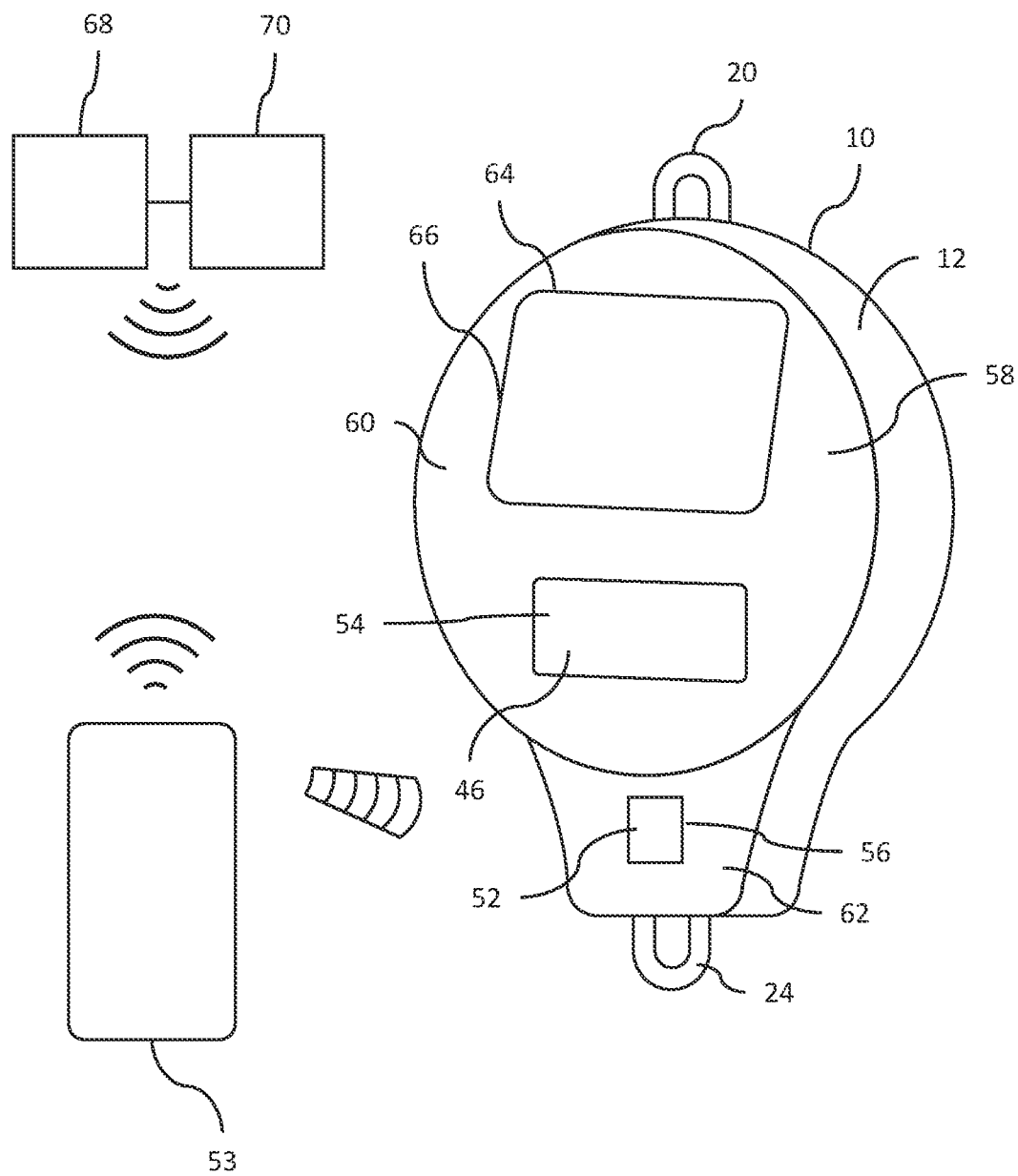
FIG. 2 is a diagrammatic view of a scale in accordance with several embodiments.
Figure 3:
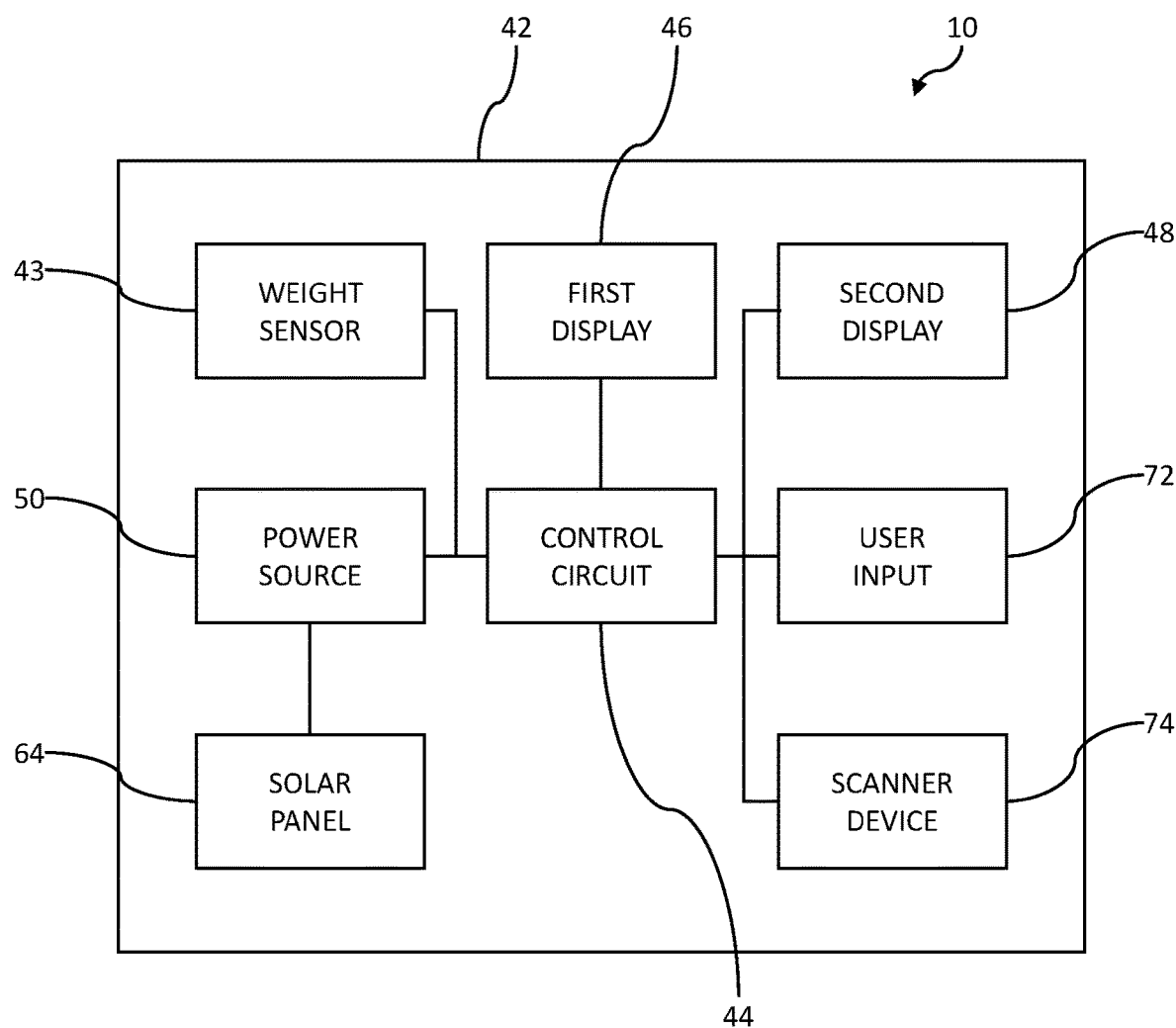
FIG. 3 is a diagrammatic view of an electronic assembly for a scale in accordance with some embodiments.
Figure 4:
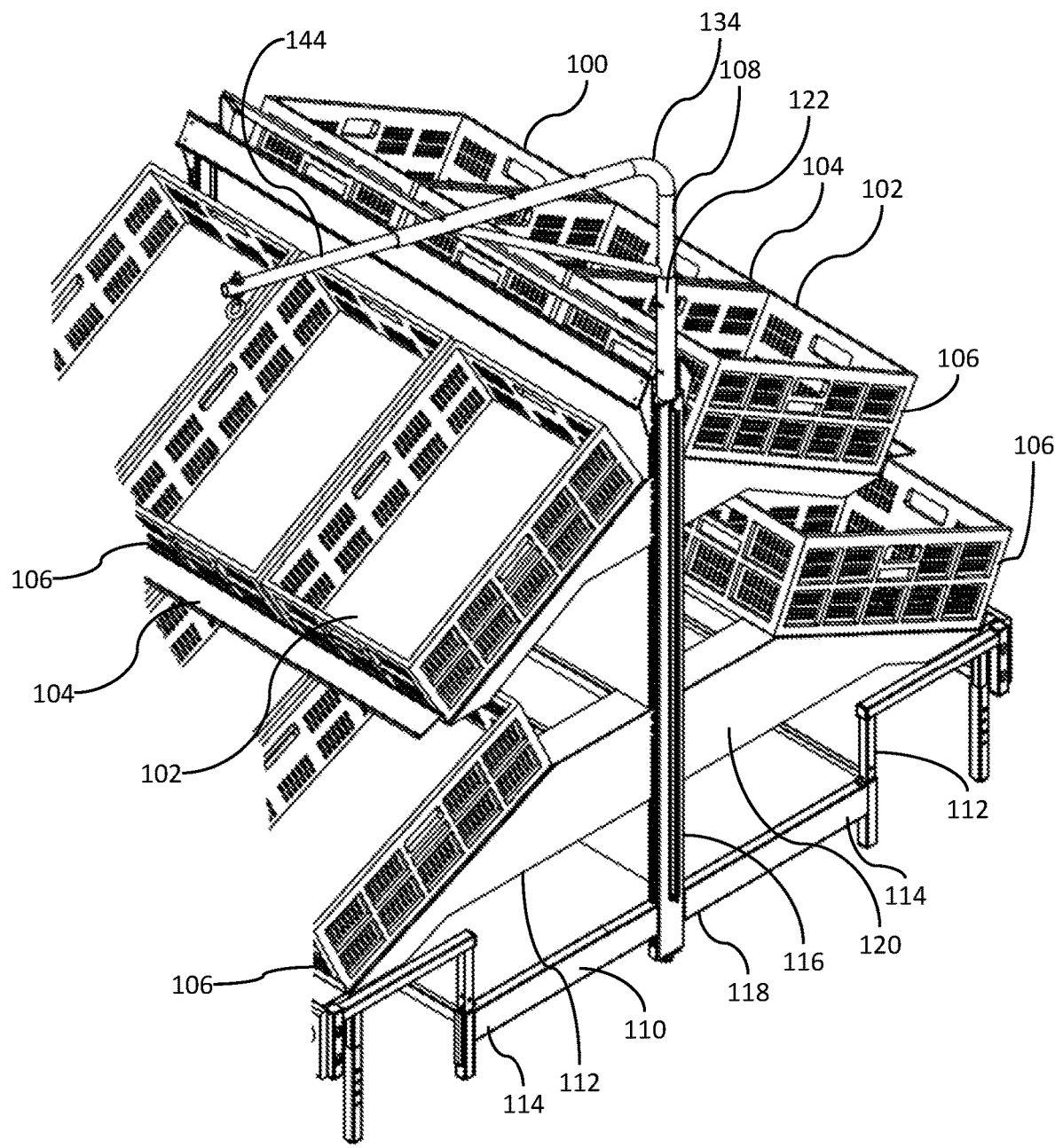
FIG. 4 is a perspective view of a gondola display and support assembly in accordance with several embodiments.
Figure 5:
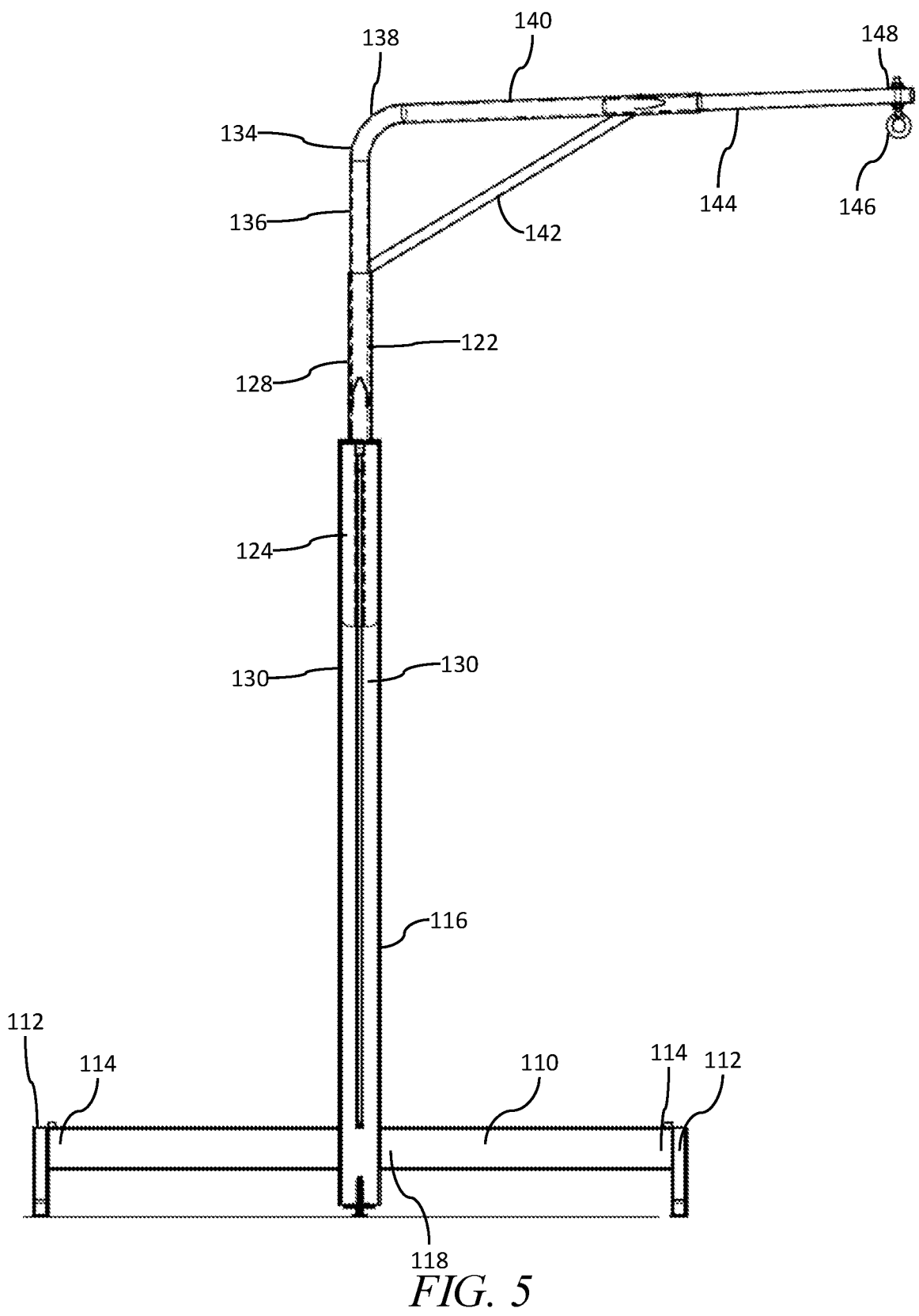
FIG. 5 is a side elevation view of the support assembly of FIG. 4 in accordance with some embodiments.

In one form, a scale 10 providing these features is shown in FIGS. 1-3. The scale 10 includes a housing 12 and a weighing assembly 14. The scale 10 is configured to be hung from a support structure 16 by a connecting member 18, such as a hook, carabiner, or the like, coupled to a bracket 20 mounted to the housing 12.

The weighing assembly 14 couples on an opposite side of the housing 12 from the support structure 16. More specifically, a connecting member (e.g., mechanical connector) 22 of the weighing assembly 14 couples to a bracket 24 projecting downwardly from the housing 12. The weighing assembly 14 further includes a frame 28 and a support member 30, such as a bowl, basket, tray, or the like. The frame 28 connects to a periphery 32 of the bowl 30. If desired, the frame 28 can include two, three, or more connections to the bowl 30. In the illustrated form, the frame 28 is constructed of a rod having vertical portions 34 connected to the bowl 30 and angled portions 36 extending from the vertical portions 34 to an apex or central bend 38. The connecting member 26 couples to the frame 28 at the apex 38 of the frame 28, which provides a balanced hanging point for the bowl 30. Additionally, the structure of the frame 28 provides clearance for placing products 40 in the bowl 30.

As shown in FIG. 3, the scale 10 further includes an electronic assembly 42 configured to determine and display the weight of the product 40. The electronic assembly 42 first includes a weight sensor 43 coupled to the bottom bracket 24 and that is configured to determine the weight of the products 40 placed in the bowl 30, as commonly understood. The electronic assembly 14 further includes a control circuit 44, a first display 46, a second display 48, and a power source 50 providing power thereto.

The term control circuit refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The control circuit 44 may be configured (for example, by using corresponding programming stored in a memory as will be well understood by those skilled in the art) to carry out one or more of the steps, actions, and/or functions described herein.

The control circuit 44 is configured to receive signals from the weight sensor 43 and cause the measured weight to be displayed on the first display 46 in any desired unit of mass. Further, the control circuit 44 is configured to encode the weight into a machine-readable code 52 and display the code 52 on the second display 48. The code 52 is configured so that, when scanned and decoded by a suitable computing device 53, such as a smart phone, tablet, or the like, the code 52 informs the computing device 53 of the measured weight. The code 52 can be any suitable code, such as a Universal Product Code (UPC), a Quick Response (QR) code, and so forth.

If desired, the housing 12 can be sized to receive one or more of the components of the electronic assembly 14 therein. More specifically, the housing 12 can include openings 54, 56 on an exterior 58 thereof sized for the first and second displays 46, 48. By a first approach as shown in FIG. 1, the second display 48 can be provided in a separate portion 59, remote from a main portion 61 of the housing 12. The second display 48 can be wired to the main portion 61 or can communicate wirelessly therewith, as desired. With this configuration, the separate portion 59 can be provided in a location convenient for users to scan to the second display 48. For example, the separate portion 59 can be mounted to a display or wall adjacent to the scale 10.

By a second approach, the first and second displays 46, 48 can be provided in a unitary housing 12 as shown in FIG. 2. The openings 54, 56 can be in a side-by-side orientation, a stacked orientation, or offset with respect to one another. In the illustrated form, the housing 12 includes a cylindrical upper portion 60 having a horizontal longitudinal axis and a trapezoidal lower portion 62 projecting downwardly from the cylindrical upper portion 60. The support structure 16 is coupled to the housing 12 at the top of the cylindrical upper portion 60, while the weighing assembly 14 projects downwardly from the trapezoidal lower portion 62. Further, the first display 46 can be positioned in the upper portion 60 so that it can be easily viewed by a customer. The second display 48 can then be disposed in the lower portion 62 so that a customer or user can easily scan the display 48 with a user device. Of course, the displays 44, 46 can be disposed in any position on the housing 12 as desired.

As shown in FIGS. 1 and 2, the power source 50 can be one or more solar panels 64 mounted to or within the housing 12. For particular settings, such as within a shopping facility having a lack of natural light, the solar panels 64 can preferably be configured to generate a sufficient amount of power to operate the electronic assembly 14 when provided with only the artificial light typically used within a shopping facility. For example, the electronic assembly 14 can be configured to operate on around 600 lux or less and, in further form, on around 400 lux. In order to orient the solar panels 64 to more efficiently receive light, the housing 12 can include an outwardly projecting portion 66 that mounts the solar panels 64 in an upwardly angled configuration so that the solar panels 64 can receive light from lighting positioned above the scale 10. Although the scale 10 is shown with the solar panels 64 on one side thereof, the scale 10 can also include solar panels on the back side thereof.

In other forms, the power source 50 can be remote from the housing 12. For example, the electronic assembly 42 can be configured to receive power through radio frequency or induction, as commonly configured, or have a wired connection to a remote power source.

So configured, when a product 40 is placed within the bowl 30 the weight sensor 43 determines the weight of the product 40. Thereafter, the control circuit 44 causes the weight to be displayed on the first display 46. The control circuit 44 also encodes the weight into the machine-readable code 52 and displays the code 52 on the second display 48 for scanning by the device 53. The user then operates the device 53 as commonly configured to scan the code 52. By one approach, the user can enter product information into the device 53 to identify the product 40 such that the weight is associated therewith after scanning the code 52. The device 53 can retrieve or receive product pricing information for the shopping facility from a central control circuit 68 and/or server device 70 or other storage device thereof. With this information, the device 53 can calculate a price of the product 40 using the pricing information and weight. By further approaches, the pricing information is configured to meet any applicable regulatory requirements, such as matching current pricing structures at point-of-sale devices within the shopping facility and accounting for any applicable taxes for the product. The device 53 can then utilize the calculated price for a subsequent purchase transaction for the product 40. The product 40 may be placed on an electronic list and all (or at least some) products on the list may be purchased in a transaction, for example, at a checkout (or, in other examples, before checkout). Consequently, there is no need to re-weigh the product at the checkout location in a store.

In one form, the control circuit 44 can be configured to encode additional information into the code 52 other than just the weight of the product 40. In a first example, the code 52 can include product identification information, such as a product code, name, or other system identifier, so that the scanning device 53 identifies the product 40 along with the weight thereof. If desired, the control circuit 44 can access or be directed to a server device 70 or other storage device storing product information to determine the product 40 associated with the system identifier. The user or customer can identify the product 40 to the scale 10 by any suitable method. By one approach, the electronic assembly 42 can include a scanner device 74 configured to scan the product 40, using a machine-readable code, such as a barcode or the like, RFID, and so forth, to identify the product 40. By another approach, the user can operate the computing device 53 to send product identification information to the scale 10 or a central control circuit 68 of the shopping facility. By another approach, the electronic assembly 42 can include a user input 72, such as a keypad, touch screen, or the like for the user to identify the product 40.

If desired, the control circuit 44 can be configured to display the calculated price for the products 40. For example, the control circuit 44 can cause the price to be displayed on one of the first or second displays 46, 48. Of course, one or three or more displays can also be utilized.

In another form, the user can enter or retrieve product identification information into the computing device 53, so that when the user scans the machine-readable code 52, the computing device 53 can decode the code 52 and associate the weight with the product 40. The computing device 53 can further be configured to retrieve suitable pricing information, as discussed herein, to thereby determine a final price for the product 40.

One example support structure 16 is shown in FIGS. 4-7. In this approach, the support structure 16 is configured to couple to a gondola display 100 so that the scale 10 hangs within easy reach of a customer. In the illustrated form, the gondola display 100 includes opposed product display surfaces 102, so that products 40 are accessible on two sides 104 thereof. If desired, the product display surfaces 102 can have multiple levels 106 and be angled downwardly to provide customers with better views of the products thereon. Gondola displays 100 are commonly featured in produce or other by-weight product areas in stores, which require scales of some configuration if a customer would like to know the total weight of a product 40, and therefore its price, before checking out.

In this form, the scale support structure 16 advantageously couples to the gondola display 100 so that the scale 10 is easily accessible on either side 104 thereof. Further, the support structure 16 can include an arm assembly 108 that is configured to rotate with respect to the gondola display 100 so that the scale 10 can be accessed from a range of locations, allowing customers to work around any potential obstacles within the facility. The support structure 16 includes a base member 110 configured to couple to the gondola display 100, such as legs or internal structure 112 thereof. The base member 110 can be secured to the gondola display 100 by any suitable mechanism, including fasteners, snap fit, brackets, tongue-and-groove, and so forth. In the illustrated form, the base member 110 spans between the sides 104 of the gondola display 100 and is anchored on both ends 114 thereof.

An upright post 116 mounts or couples to the base member 110 at an intermediate portion 118 thereof, such as generally centrally as shown. The post 116 extends upwardly along an end 120 of the gondola display 100 to a desired height. Alternatively, if desired, the post 116 can be integral with the base member 110. In the illustrated form, the post 116 extends to a height equal to or above the product display surfaces 102 or equal to or above a height of internal structure 112 of the gondola display 100.

By one approach, the post 116 is configured to rotatably couple to the arm assembly 108. More specifically, in one form, the arm assembly 108 includes a first member 122 having a downwardly extending plug portion 124, an outwardly projecting wall portion 126, and an upper tubular portion 128. In some forms, the post 116 has a hollow interior sized to receive the plug portion 124 therein, such that the outwardly projecting wall portion 126 abuts the post 116 when the plug portion 124 is fully inserted into the post 116.

Figure 6:
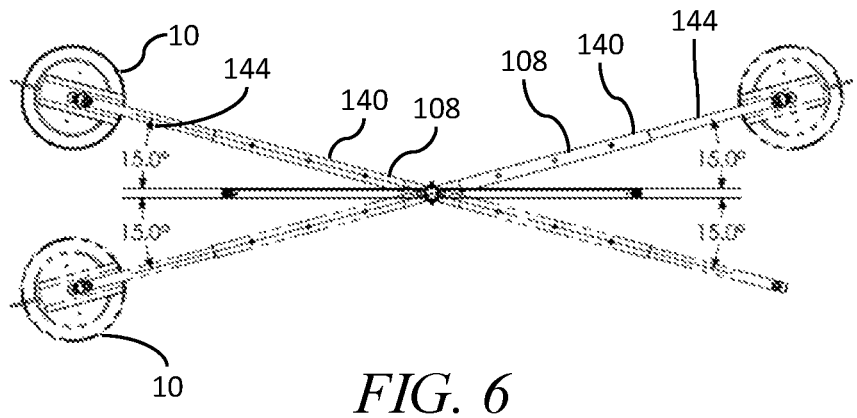
FIG. 6 is a schematic top plan view of the support assembly of FIG. 4 in accordance with several embodiments.

If desired, the plug portion 124 can be configured to rotate within the post 116 so that the scale 10 can be accessed in a wider range. By some approaches, rotation of the arm assembly 108 can be restricted so that the assembly 108 will not be spun around uncontrollably. Pursuant to this, the plug portion 124 and post 116 can include interacting stop surfaces 130 configured to abut one another at desired horizontal rotation angles, such as about 15 degrees to each side with respect to a plane running through the end 120 of the gondola display 100 as shown in FIG. 6. Of course, the stop surfaces 130 can be configured to allow more or less rotation as desired. In the illustrated form, the plug portion 124 has an X-shaped cross section with outwardly extending wall portions 132 configured to abut the stop surface 130 of the post at desired angles.

Figure 7:
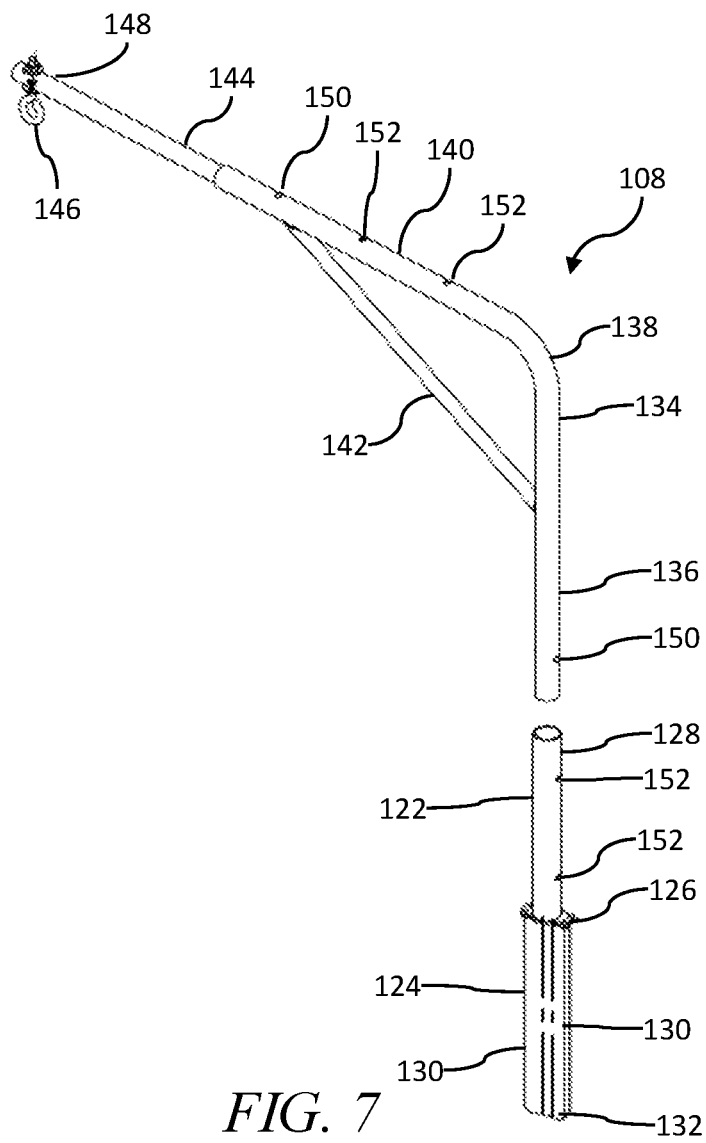
FIG. 7 is an exploded perspective view of the support assembly of FIG. 4 in accordance with some embodiments.

As shown in FIG. 7, the arm assembly 108 further includes an elbow member 134 configured to couple to the upper tubular portion 128 of the first member 122. The elbow member 134 includes an upstanding portion 136, a bend portion 138, and a horizontal portion 140. If desired, due to the weight of the scale 10 and the potential weight of any products 40 placed thereon, the elbow member 134 can include a brace 142 spanning between the upstanding portion 136 and the horizontal portion 140. The arm assembly 108 next includes a distal member 144 configured to couple to the elbow member 134. A connector 146, such as an eye hook or the like, is mounted to the distal member 144 at an end portion 148 thereof for connection to the scale 10.

Advantageously, the first member 122, elbow member 134, and distal member 144 can utilize biased pushbuttons 150 so that the members 122, 134, 144 can telescope relative to one another so that the arm assembly 108 can have an adjustable height and adjustable reach. As such, for each coupling, one of the members 122, 134, 144 has the pushbutton 150 mounted thereto and the other member 122, 134, 144 includes spaced openings 152. So configured, a user slides the members 122, 134, 144 along one another until the pushbutton 150 aligns with a desired opening 152. Thereafter, the pushbutton 150 projects through the opening 152 to couple the members 122, 134, 144 together. When adjustment is desired, the user can then depress the pushbutton 150 so that the pushbutton 150 is pressed through the opening 152 and the user can slide the member 122, 134, 144 to align a new opening 152.

Figure 8:
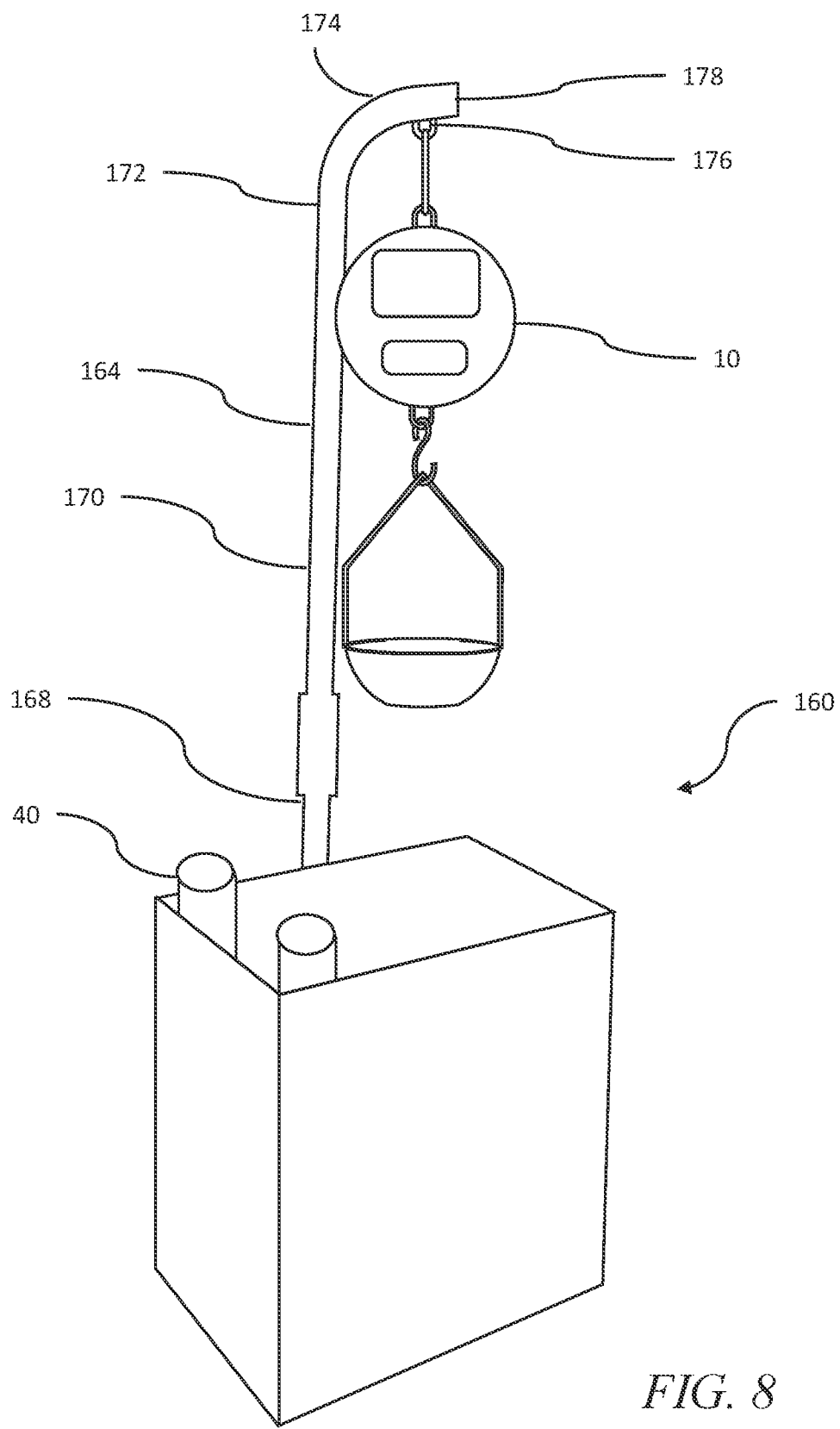
FIG. 8 is a perspective view of a support assembly in accordance with several embodiments.

In another form, as shown in FIG. 8, the scale 10 can be hung from a free-standing support 160. In this form, the support 160 includes a base 162 and an upstanding arm 164. The base 162 sized to securely support the arm 164 and the scale 10 mounted thereto. The base 162 can take any desired form, including rectangular, as shown, circular, and so forth. If desired, products 40 and/or products with packaging 166, such as boxes, trays, etc. can be displayed on the base 162. Further, the base 162 can be sized to support the products 40 or packaging 166 in a secure configuration. By some approaches, the arm 164 can be adjustable, utilizing telescoping members 168, 170 that couple together by any suitable mechanism, such as the arm assembly 108 described above, friction fit, and so forth. Further, similar to the arm assembly 108, the arm 164 includes a bend portion 172 and a distal portion 174 with a connector 176 at an end 178 thereof for attaching to the scale 10.

Figure 9:
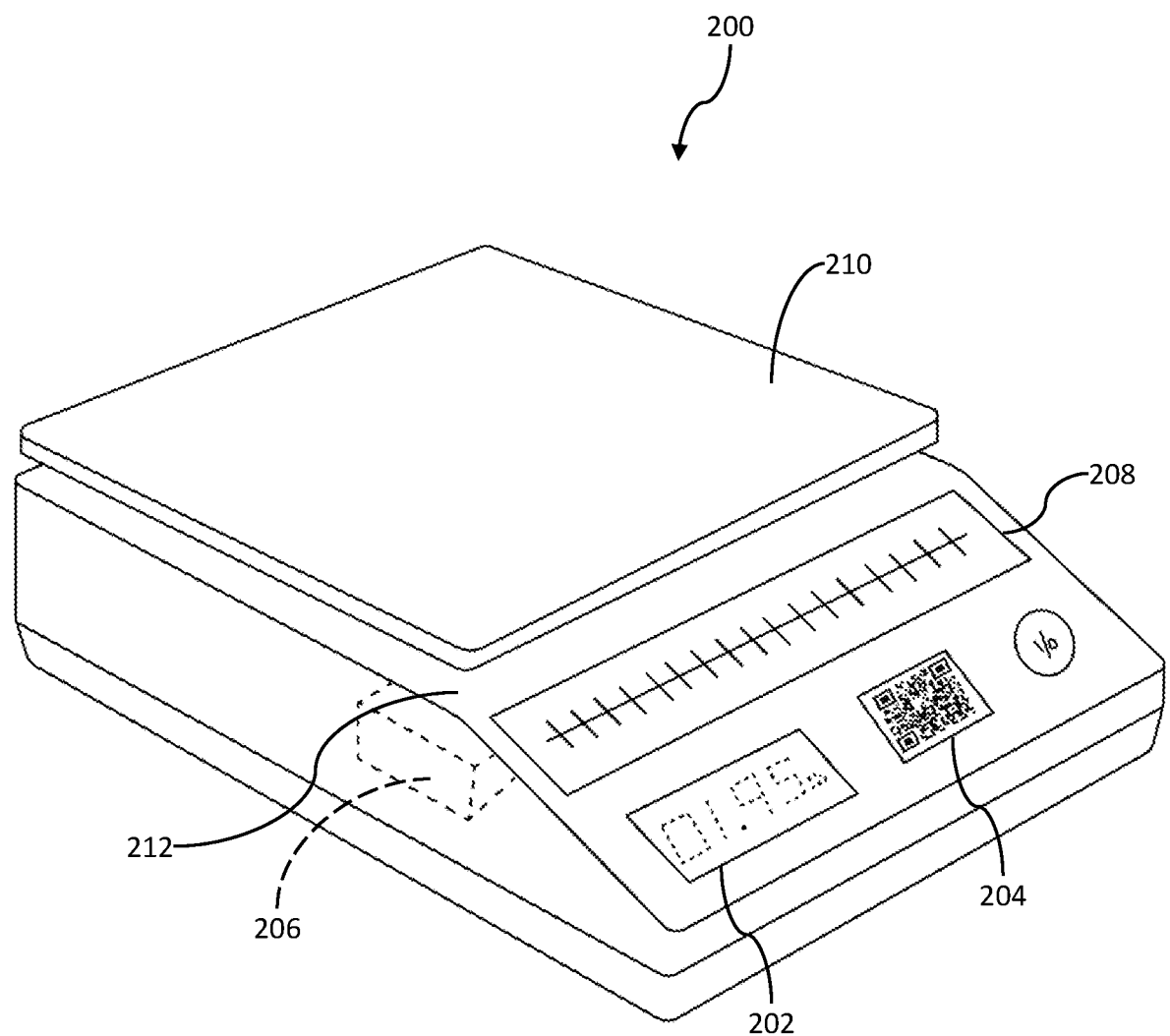
FIG. 9 is a perspective view of a scale in accordance with some embodiments.
Figure 10:
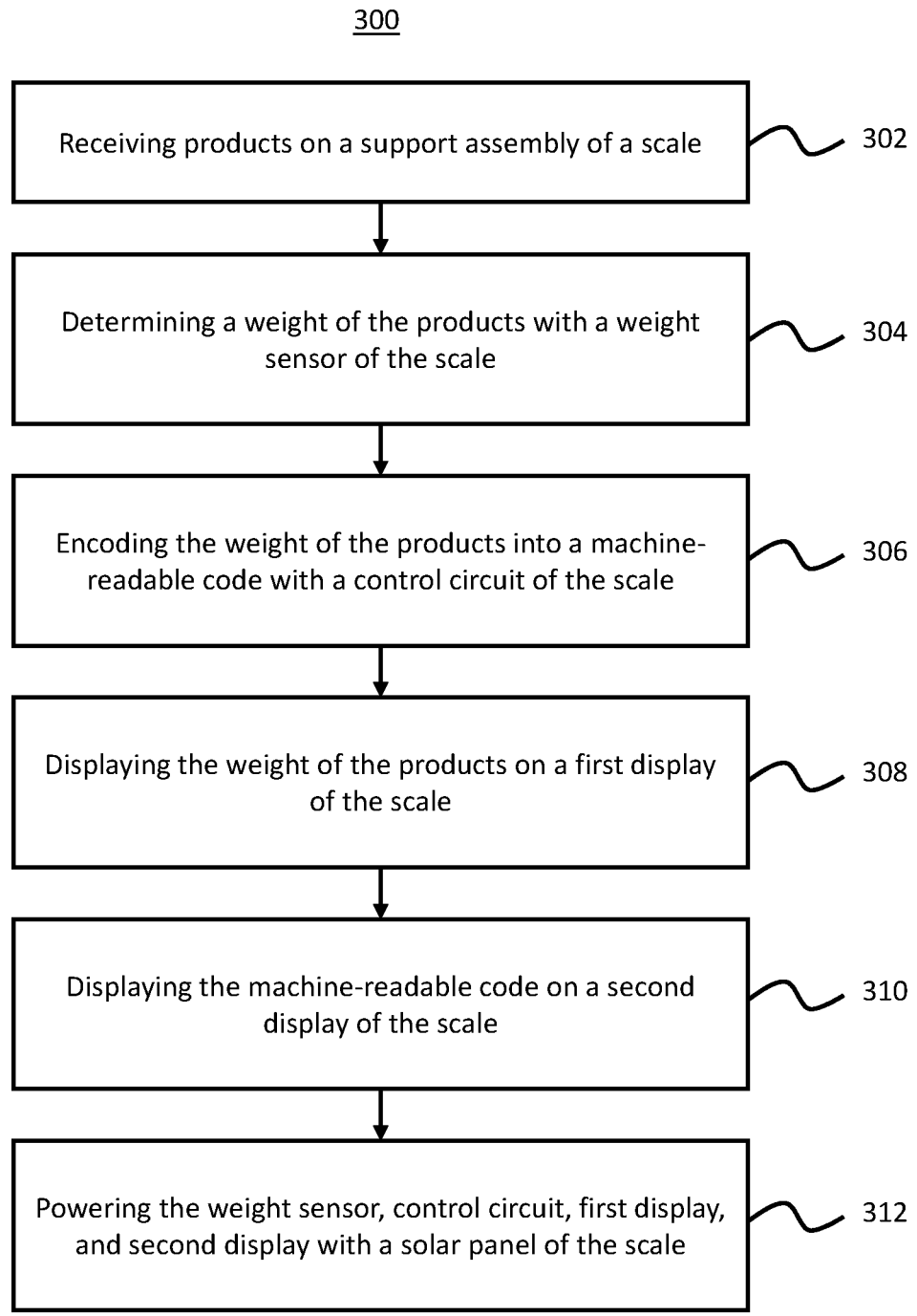
FIG. 10 is a flowchart in accordance with several embodiments.

In another form, a surface scale 200 can be utilized in place of the hanging scale 10 described above. As shown in FIG. 9, the scale 200 can include first and second displays or display portions 202, 204 forming a portion of an electronic assembly 206 that operates similar to the one described above. If desired, the electronic assembly 206 can include one or more solar panels 208 to provide power thereto, as discussed above. Rather than a hanging weighing assembly 14, however, the surface scale 200 includes an upwardly facing weighing surface 210 mounted at a top 212 of the scale 200 as commonly understood.

In some embodiments, a scale for weighing products in a shopping facility is described herein that includes: a housing; an electronic assembly disposed within the housing; a support assembly coupled to the electronic assembly to hang below the housing, the support assembly configured to receive the products thereon during weighing; a weight sensor of the electronic assembly coupled to the support assembly and configured to determine a weight of the products on the support assembly; a control circuit of the electronic assembly configured to receive the weight determined by the weight sensor and encode the weight into a machine-readable code; a first display of the electronic assembly configured to receive a signal from the control circuit to display the weight of the products; a second display of the electronic assembly configured to receive a signal from the control circuit to display the machine-readable code; and a solar panel of the electronic assembly configured to supply power thereto.

By several approaches, the control circuit can be configured to encode the weight into the machine-readable code comprises the control circuit configured to encode the weight into a QR code.

By some approaches, the solar panel can be mounted to a front wall portion of the housing with an upwardly angled orientation. By further or other approaches, the solar panel is configured to provide sufficient power for the electronic assembly to operate with a 400 lux light source.

By several approaches, the control circuit can be configured to: receive or retrieve product identification information; and encode the weight and the product identification information into the machine-readable code.

By some approaches, the housing can include a cylindrical upper portion and a trapezoidal lower portion, with the support assembly connecting to the weight sensor through the trapezoidal lower portion. By further approaches, the first display can be mounted to the cylindrical upper portion of the housing and the second display can be mounted to the trapezoidal lower portion of the housing.

By several approaches, the housing can include a bracket on a top thereof; and further comprising a support arm configured to couple to the bracket so that the housing and support assembly hangs therefrom. By further approaches, the support arm can be configured to be mounted to a product display.

In several embodiments, a method for encoding a weight of products in a shopping facility into a machine-readable code is described herein that includes: receiving products on a support assembly of a scale; determining a weight of the products with a weight sensor of the scale; encoding the weight of the products into a machine-readable code with a control circuit of the scale; displaying the weight of the products on a first display of the scale; displaying the machine-readable code on a second display of the scale; and powering the weight sensor, control circuit, first display, and second display with a solar panel of the scale.

By some approaches, encoding the weight into the machine-readable code can include encoding the weight into a QR code.

By several approaches, powering the weight sensor, control circuit, first display, and second display with the solar panel can include powering the weight sensor, control circuit, first display, and second display with a 400 lux light source.

By some approaches, the method can further include: receiving or retrieving product identification information for the products; and wherein encoding the weight of the products into the machine-readable code further includes encoding the product identification information into the machine-readable code.

In others of these embodiments, a scale system for weighing products in a shopping facility includes a user electronic device, a housing, an electronic assembly, a mechanical connector, a weight sensors, a product identification input device, a control circuit, a first display, a second display, a solar panel, and a central server device.

The user electronic device includes a sensor. The electronic assembly is disposed within the housing.

The support assembly is coupled to the electronic assembly to hang below the housing and is configured to receive the products thereon during weighing. The weight sensor of the electronic assembly is coupled to the support assembly via the mechanical connector and configured to determine a weight of the products on the support assembly.

The product identification input device is configured to obtain product identification information that uniquely identifies the product. The control circuit of the electronic assembly is coupled to the product identification device and the weight sensor and is configured to receive the weight determined by the weight sensor and the product identification information from the product identification input device, and encode the weight and the product identification into a machine-readable code.

The first display of the electronic assembly is configured to receive a signal from the control circuit to display the weight of the products. The second display of the electronic assembly is configured to receive a signal from the control circuit to display the machine-readable code.

The solar panel of the electronic assembly is configured to supply power thereto, and is configured and arranged to obtain sufficient power for operation of the electronic assembly using only artificial light.

The central server device is disposed remotely from the shopping facility and is communicatively coupled to the user electronic device. The central server device stores pricing information associated with the products.

The user electronic device scans the machine-readable code using the sensor, retrieves the pricing information from the central server device according to the product identification information in the code, and calculates the price of the products using the pricing information and the weight.

In aspects, the control circuit is configured to encode the weight into the machine-readable code comprises the control circuit configured to encode the weight into a QR code.

In other aspects, the solar panel is configured to provide sufficient power for the electronic assembly to operate with a 400 lux light source.

In still other aspects, the housing includes a bracket on a top thereof. The housing further comprises a support arm configured to couple to the bracket so that the housing and support assembly hangs therefrom. In examples, the support arm is configured to be mounted to a product display.

In yet other aspects, the user electronic device is configured to create a list that includes the products that are weighed and to the list is utilized to purchase the products at a checkout in the shopping facility.

In examples, the product identification input device is a scanner device. For instance, the product identification input device may be a keypad or touchscreen. Other examples are possible.

In other examples, the user electronic device is a smartphone or a tablet. Other examples are possible.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A scale system for weighing products in a shopping facility, the scale system comprising:
    an assembly disposed at a shopping facility and configured to receive products thereon for weighing;
    a weight sensor coupled to the assembly and configured to determine a weight of the products on the assembly;
    a control circuit coupled to the weight sensor, the control circuit configured to receive the weight determined by the weight sensor and encode the weight into a single code;
    a first display configured to receive a first signal from the control circuit to display the single code;
    a second display that is separate from the first display and configured to receive a second signal from the control circuit to display the weight, the weight being displayed on the second display in entirely numeric form and not as a code or alphanumeric value;

wherein the first display and the second display are incorporated into a unitary housing;

wherein a customer utilizes a user electronic device to enter product information about the products to associate the product information with the weight after the code is scanned by the user electronic device;

wherein the user electronic device receives pricing information of the products at the shopping facility and calculates the price of the products using the pricing information and the weight.

2. The scale system of claim 1, further comprising a power source coupled to the assembly.

3. The scale system of claim 2, wherein the power source comprises a solar panel configured to provide sufficient power for the assembly to operate with a 400 lux light source.

4. The scale system of claim 1, wherein the user electronic device is configured to create a list that includes the products that are weighed and to utilize the list to purchase the products.

5. The scale system of claim 1, wherein the user electronic device retrieves the pricing information from an external source.

6. The scale system of claim 1, wherein the user electronic device is a smartphone or a tablet.

7. The scale system of claim 1, wherein the shopping facility is a retail store.

8. The scale system of claim 1, wherein the code is a QR code or a UPC code.

9. The scale system of claim 1, wherein the pricing information includes current price structures at point-of-sale devices and applicable sales tax.

10. A method for encoding a weight of products in a shopping facility into a code, the method comprising:
receiving products on an assembly of a scale disposed at a shopping facility;
at a weight sensor, determining a weight of the products on the assembly;
at a control circuit coupled to the weight sensor, receiving the weight determined by the weight sensor and encoding the weight into a single code;
displaying the single code on a first display;
displaying the weight on a second display that is separate from the first display, the weight being displayed on the second display in entirely numeric form and not as a code or alphanumeric value;
wherein the first display and the second display are incorporated into a unitary housing;
wherein a customer uses a user electronic device to enter product information about the products to associate the product information with the weight after the code is scanned by the user electronic device and wherein the user electronic device receives pricing information of the products at the shopping facility and calculates the price of the products using the pricing information and the weight.

11. The method of claim 10, wherein the user electronic device is configured to create a list that includes the products that are weighed and to utilize the list to purchase the products.

12. The method of claim 10, wherein the user electronic device retrieves the pricing information from an external source.

13. The method of claim 10, wherein the user electronic device is a smartphone or a tablet.

14. The method of claim 10, wherein the shopping facility is a retail store.

15. The method of claim 10, wherein the code is a QR code or a UPC code.

16. The method of claim 10, wherein the pricing information includes current price structures at point-of-sale devices and applicable sales tax.

\* \* \* \* \*